United States Patent [19]
Chiocchio et al.

[11] 3,962,120
[45] June 8, 1976

[54] POLYURETHANE FOAM GENERATING APPARATUS

[75] Inventors: Louis R. Chiocchio; Robert S. Zirlis, both of East Haven, Conn.

[73] Assignee: Olin Corporation, New Haven, Conn.

[22] Filed: Apr. 28, 1975

[21] Appl. No.: 572,002

Related U.S. Application Data

[63] Continuation-in-part of Ser. No. 451,255, March 14, 1974, abandoned.

[52] U.S. Cl. ............................. 252/359 E; 425/155
[51] Int. Cl.² .......................................... B01J 13/00
[58] Field of Search ..................... 252/359 E; 259/4; 264/40, 54; 425/155; 260/2.5 BC

[56] References Cited
UNITED STATES PATENTS

| | | |
|---|---|---|
| 3,424,439 | 1/1969 | Baker .................... 259/4 |
| 3,541,023 | 11/1970 | Cole .................. 252/359 E |
| 3,621,519 | 11/1971 | Vandemore et al. ............ 18/2 |
| 3,711,067 | 1/1973 | Kovacs ................. 259/191 |
| 3,769,232 | 10/1973 | Houldridge ............ 252/359 E |

*Primary Examiner*—Jack Sofer
*Attorney, Agent, or Firm*—F. A. Iskander; T. P. O'Day

[57] ABSTRACT

An improved apparatus is disclosed for the on-site generation of polyurethane foam. The apparatus comprises a timing device, which is readily accessible to the foaming operator, for accurately controlling the size of each foam shot.

14 Claims, 5 Drawing Figures

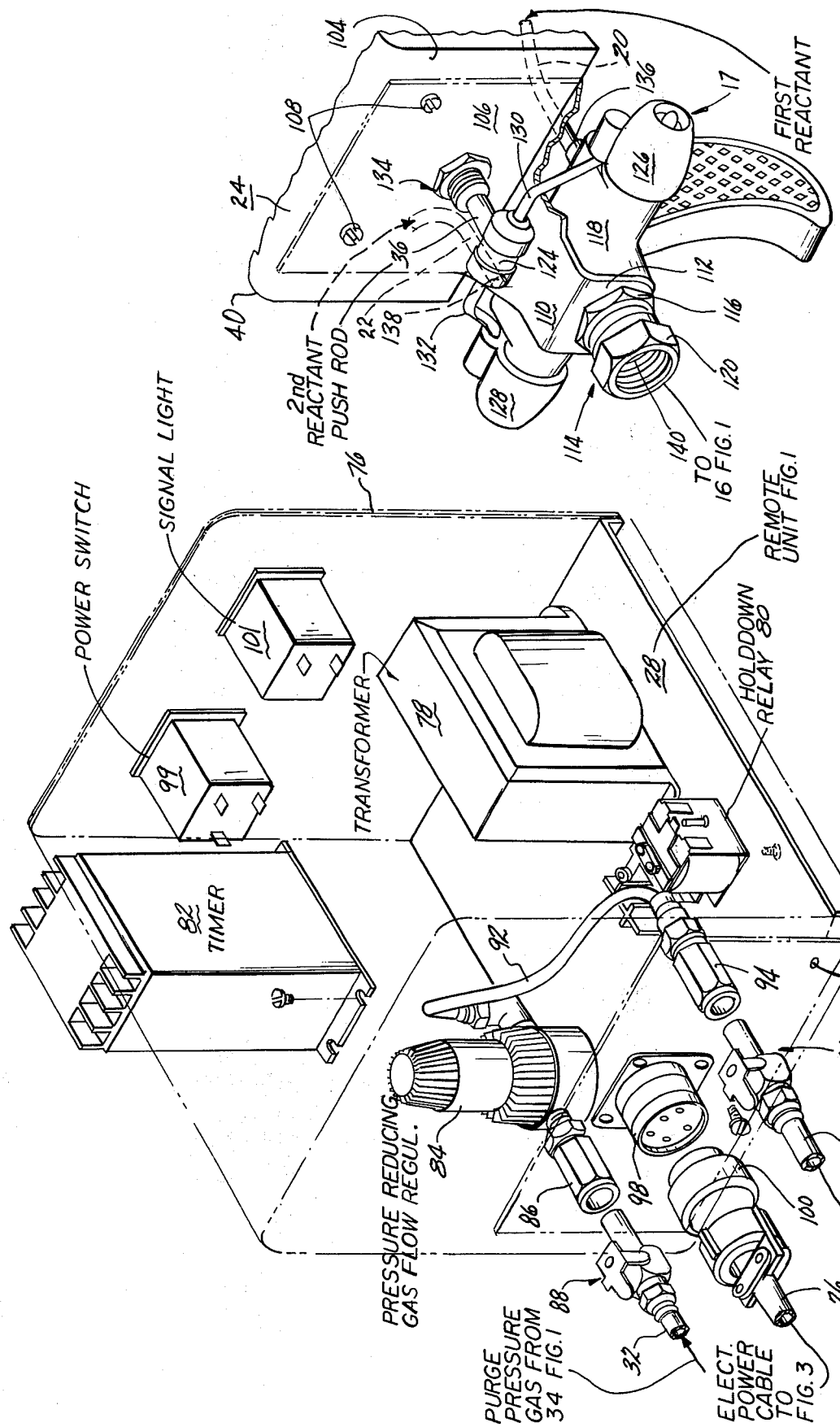

POLYURETHANE FOAM GENERATING APPARATUS

This application is a continuation-in-part of copending application Ser. No. 451,255, filed Mar. 14, 1974, now abandoned.

This invention relates to an improved apparatus and method for the on-site generation of polyurethane foam.

The use of so-called "portable foaming apparatus" for the on-site generation of polyurethane foam is well known. A variety of such apparatus has been disclosed in the art for this purpose. See for example U.S. Pat. No. 3,541,023 and No. 3,178,157. Typically an apparatus of this type comprises (1) two tanks for supplying two polyurethane foam-forming reactants, (2) a mixing chamber provided with one or more inlets for receiving the reactants and with one outlet for ejecting the foamable mixture, (3) valve assemblies for admitting the flow of the reactants through the mixing chamber and (4) manually operated connecting means for operating the foam apparatus by coordinating the opening and closing of the valve assemblies. The reactants are propelled from their respective tanks, into and out of the mixing chamber, by suitable means such as by imposing gas pressure in the reactants supply tanks. Such foaming apparatus, by virtue of their relative portability and the fact that they lend themselves to simple manual operation at the exact location where the generation of foam is required, have been widely utilized in a variety of industrial application. For example, they have been used in the production of foam-core structural panels, foam-insulated beverage containers, and in the insulation of refrigerated trucks, homes and industrial installations.

However, to the extent that these prior art foaming apparatus are manually operated, as contrasted with automatic or computerized operation, they have one basic drawback. This is that, due to the human factor involved in their operation, it is difficult, and often impossible, to adequately control or duplicate the size of individual foam shots dispensed from such apparatus. As a result, product uniformity and quality are often sacrificed or compromised, not to mention waste in materials and man-power.

A solution to this problem has been proposed in U.S. Pat. No. 3,769,232, which issued to T. A. Houldridge on Oct. 30, 1973. Aimed at controlling and duplicating small-size foam shots, this patent teaches the use of a timer, remotely connected to the mixing chamber inlet and outlet valves, for simultaneous, accurately-timed opening and closing of these valves. Since the size of each foam shot is a direct function of shot duration, this solution thus utilizes an electric timer to, in effect, eliminate the human error factor connected with determining or estimating foam shot size. To this extent, the teaching of the Houldridge patent, while it requires the services of an additional human operator who would be charged with operating and monitoring the timer, does provide a workable solution to the problem. However, a need still exists in this art for an improved foaming apparatus which is adapted to be easily operated and controlled by a single operator for the accurately-controlled, on-site generation of polyurethane foam.

Now, according to the invention, an improvement has been developed in this type of apparatus which enables the generation of variable but accurately-controlled foam shots in an easy and simple manner that requires a minimum of human labor. Generally speaking, the improvement resides in a novel timing system, adapted to be easily operated and controlled from a location which is readily accessible to the operator of the foaming apparatus, which timing system is connected to the mixing chamber valve assemblies for timed opening thereof. More specifically, and in accordance with the preferred embodiments illustrated herein, the improved apparatus of the invention comprises a. two tanks for supplying a first and a second interreactive polyurethane foam-forming materials, b. a mixing chamber having inlet means for receiving the first and second materials from their respective tanks and an outlet for dispensing the mixed materials from the mixing chamber, c. first and second valve means for admitting the flow of the first and second materials, respectively, through the mixing chamber, d. connecting means for coordinating the closing and opening operation of the first and second valve means, e. an electrical actuator means for operating the connecting means, and f. electrical timing means, adapted to be connected to an electrical power source, for operating the actuator means for a predetermined time period, the timing means being comprised of 1. an electrical timer which is electrically connected to the actuator means for timed energization thereof, 2. a potentiometer, adjacent to the mixing chamber, which is electrically connected to the timer and manually operable to vary the time period during which the timer is energized, and 3. switch means mounted adjacent to the mixing chamber for connecting the electrical power source to the timer thereby energizing the timer.

Reference will now be made to the drawings in which

FIG. 1 is a schematic diagram of one form of the foaming apparatus of the invention;

FIG. 2 in a fragmentary view, partly in cross-section, showing a static mixing chamber for use in the foaming apppratus of FIG. 1;

FIG. 4 is an exploded view of a remote electrical unit which is used in conjunction with the control unit of FIG. 3;

FIG. 5 is a perspective view showing one form of mounting the control unit at the front end of the foaming apparatus;

Figures 1, 2, 3:
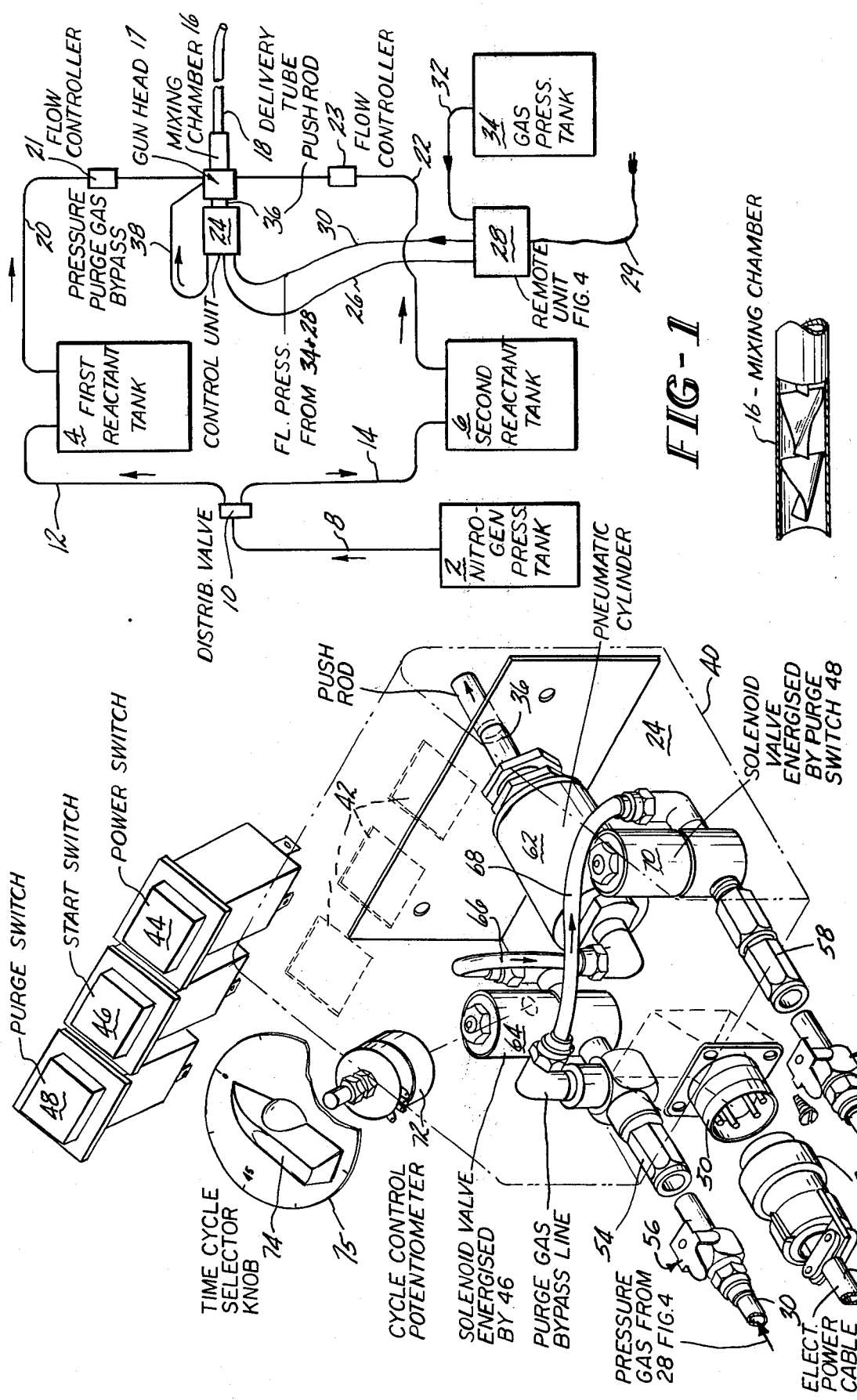
FIG. 3 is an exploded perspective view of an electrical control unit which is used as part of the timing system in the apparatus of FIG. 1.

The apparatus illustrated in FIG. 1 comprises a conventional nitrogen pressure tank 2 which is preferably used as a means of pressurizing first reactant supply tank 4 and second reactant supply tank 6 to expel the reactants therefrom. The outlet of nitrogen tank 2 is connected via conduit 8 to a conventional two-outlet gas pressure distributing valve 10 which in turn communicates with supply tank 4 via conduit 12 and with supply tank 6 via conduit 14.

The mixing chamber is denoted by numeral 16 in FIG. 1. This mixing chamber is an essential component of the portable foaming apparatus. Its use is mandated by the fact that it is ordinarily not possible to achieve adequate mixing of the reactants, to the degree necessary for obtaining a uniform and acceptable foam product, by merely bringing them together such as by flowing these reactants through a common outlet. The mixing chamber is preferably of the static type, having substantially no moving parts. Typically such a chamber is provided with internal elements designed to effect thorough and intimate mixing of two or more fluids passing therethrough. Any suitable such static mixer may be used. However, it is particularly preferred to employ the mixing chamber described in U.S. Pat. No. 3,286,992, issued to Armeniades et al on Nov. 22, 1966, the entire disclosure of which is incorporated by reference herein. This mixing chamber, which is illustrated in FIG. 2, is made up essentially of a hollow cylindrical tube having a plurality of curved, sheet-like elements extending in series longitudinally within the tube. Each element extends to the tube wall throughout its length and divides its embracing portion of the tube into separate channels or chambers, the total cross-sectional area of each chamber being substantially constant throughout the length of its dividing element. The elements are arranged in alternating positions and in point-contact with one another substantially along the tube axis.

Located at or near the inlet end of mixing chamber 16 is a gun head assembly, denoted by numeral 17, which is adapted to be held by the operator in directing the flow of reactants out of the mixing chamber and optional delivery tube 18. This assembly, which may be of any suitable or conventional type, usually comprises two valved passageways (shown in FIG. 5) communicating with the mixing chamber inlet, one passageway being linked with tank 4 via conduit 20 and the other passageway being connected to tank 6 via conduit 22. The assembly also comprises suitable connecting means, in this instance a crank 124 (shown in FIG. 5), which is adapted to coordinate the opening and closing of the passageway valves. If desired each of conduits 20 and 22 may be provided with a filter element (not shown) this being of any conventional or suitable type, to remove any foreign, solid particles which may be present in the reactants flowing to the mixing chamber. It is also preferred to interpose in each of lines 20 and 22 flow control units 21 and 23, respectively, in order to regulate the rate of flow of each reactant, from its respective tank, and thereby enable the supply of these reactants to the mixing chamber in a predetermined ratio. Any suitable type of flow controllers may be used for this purpose such as the devices described in U.S. Pat. No. 3,541,023, which issued to Cole, Nov. 17, 1970. These controllers, detailed in FIGS. 3 and 4 of the Cole patent, incorporate means to enable adjusting the flow therethrough to any desired constant rate so that the relative porportions of reactants flowing from tanks 4 and 6 can be varied depending on their respective compositions and/or viscosities.

Timed actuation of the gun head valve assembly, for coordinated opening and closing of the valved passageways therein, is achieved by means of an electrical control unit 24 which in this instance is mounted on the gun head 17 by any suitable means such as detailed hereinbelow with reference to FIG. 5. Control unit 24 is connected, via electrical cable 26, to remote unit 28 which in turn may be connected to a conventional electrical power source (not shown) by means of electrical conductor 29. Preferably and as shown in FIG. 1, unit 28 is located at a sufficiently distant location from mixing chamber 16 and unit 14. Unit 28 also supplies a pressurized fluid to control unit 24 via conduit 30, this fluid being supplied in turn to the remote unit 28 via conduit 32 which is connected to a conventional fluid pressure tank 34. The preferred fluid for this purpose is a suitable gas such as air which is particularly preferred by virtue of its ready availability and the fact that it is inert to the foam forming reactants.

Protruding from the front end of control unit 24 is a push rod 36 which engages the valve-opening crank 124 on gun head 17 and which is adapted, upon activation of the timer, to move forward. By virtue of this forward movement of push rod 36, the inlet valves in gun head 17 are simultaneously opened, these valves being subsequently closed when the selected time cycle is expired causing control unit 24 to become deactivated and push rod 36 to retract to its initial position.

Optionally, and in accordance with a particularly preferred embodiment of the invention, the pressurized fluid which is supplied from tank 34, is occasionally injected into and through mixing chamber 16 and delivery tube 18 to purge residual material that may accumulate after one or several foam shots have been made. This may be accomplished for example by directing the fluid entering control unit 24 via conduit 30 to the mixing chamber inlet by means of conduit 38 and a separate, third valved inlet or passageway (not shown) in gun head 17. As described hereinbelow with reference to FIGS. 3 and 6, means (not shown in FIG. 1) is provided in control unit 24 for manually directing the pressurized fluid through this third passageway, into and out of the mixing chamber and delivery tube.

Reference is now made to FIG. 3 for a detailed description of control unit 24. This comprises a housing 40 having three square openings 42 which accommodate three push-button, lighted switches, namely a power on-off switch 44, a start switch 46, and a purge switch 48. Power to energize the control unit is received via electrical socket 50 which protrudes from housing 40 and which is adapted to receive an electrical plug connector 52 mounted on the end of electrical cable 26 that leads to remote unit 28 (FIG. 1). Numeral 54 denotes a gas inlet, which protrudes from housing 40 and is adapted to receive quick-connect male member 56 mounted on the end of conduit 30 which leads to remote unit 28; and numeral 58 denotes a protruding gas outlet which is adapted to receive quick-connect male member 50 mounted on the end of conduit 38 which leads to gun head 17 (FIG. 1).

Pneumatic cylinder 62 activates push rod 36 which protrudes from control unit 24 as noted in FIG. 1 above. Pneumatic cylinder 62 is in turn activated by pressurized fluid supplied to it through inlet 54, solenoid valve 64 and conduit 66. As described hereinbelow with reference to FIG. 6, solenoid valve 64 is in turn electrically connected to, and energized by start switch 46.

Inlet 54 is also connected via by-pass conduit 68 to a second solenoid valve 70, which is in turn connected to outlet 58 as shown. Again as described hereinbelow with reference to FIG. 6, solenoid valve 70 is electrically connected to, and energized by, purge switch 48, which thereby causes fluid to flow from outlet 58, through conduit 38, gun head 17, and mixing chamber 16 (FIG. 1).

Also mounted within housing 40 is a potentiometer or variable resistor 72 which is manipulated by time cycle selector knob 74 and dial 75 outside housing 40. Potentiometer 72 makes up the manually operated time-control segment of the timing assembly, the other segment of which, i.e., the timer itself, is housed in remote unit 28 and connected to potentiometer 72 as described hereinbelow with reference to FIGS. 4 and 6.

Remote unit 28 is described in detail by reference to FIG. 4. This unit comprises a casing 76 which houses a step-down transformer 78, a hold-down electrical relay 80, and a timer 82 which, together with potentiometer 72 (FIG. 3), makes up the over-all timing assembly. All three of these items are electrically activated by means of electrical connections and circuitry described in detail hereinbelow with reference to FIG. 6. Timer 82 may be of any conventional or suitable type. However, due to its relatively small size, an electronic or solid-state timer is preferably used as illustrated hereinbelow with reference to FIG. 6. The function of step-down transformer 78, which can be of any suitable or conventional type, is to reduce the voltage transmitted to control unit 24 (FIGS. 1 and 2) to a safer level, in this instance to 24 volts. This transformer is not an essential feature of the apparatus of the invention, although its use is preferred for safety reasons, particularly where such voltage reduction is required by local ordinance or electric code. Neither is hold-down relay 80 essential for proper functioning of the apparatus of the invention. The function of the relay is to maintain the flow of electrical current to solenoid valve 64 (FIG. 3), for the time interval selected on the control unit 24, after pushbutton start switch 46 (FIG. 3) is released. Thus in this particular instance, inasmuch as switch 46 is of the pushon, release-off type, the relay is used as a desirable or convenient expedient to eliminate the necessity for maintaining depressive pressure on switch 46 during the execution of each foaming shot or operation. As such, the relay may be looked upon as a remote, complementary part of the switching means in control unit 24 (FIG. 3).

Also housed within casing 76 is a gas-flow regulator 84 which may be of any conventional type. This serves the desirable, though non-essential, function of regulating or reducing the pressure of the fluid, flowing from tank 34 (FIG. 1) and eventually through control unit inlet 54 (FIG. 3) to a suitable or uniform level, e.g., 100 psi or less. The fluid is fed to regulator 84 via inlet 86, which protrudes from casing 76. Inlet 86 is adapted to receive quick-connect male member 88 of conduit 32 which leads to fluid pressure tank 34 (FIG. 1). Fluid flowing out of regulator 84 travels through conduit 92, and out of remote unit 28 via protruding outlet 94. Outlet 94 is adapted to receive quick-connect male member 96 that is mounted on the end of conduit 30 leading to control unit 24 (FIG. 1).

Electrical power is transmitted to control unit 24 (FIGS. 1 and 3) from electrical socket 98, protruding from casing 76, which socket is adapted to receive plug connector 100, the latter being linked to control unit 24 (FIG. 1) by means of cable 26. Electrical power is supplied to transformer 78 in remote unit 28 by means of an electrical conductor 29 which plugs into a conventional electrical power source outlet (not shown).

Electrical power is turned on by means of pushbutton switch 99 which incorporates a power-on signal light (not shown). Remote unit 28 also includes an operating signal light 101, which is adapted to be energized by start switch 46 in control unit 24 (FIG. 3) and remains so energized during the course of each foam generation cycle.

Reference will now be made to FIG. 5 which demonstrates one mode of mounting control unit 24 on the foaming apparatus gun head assembly and in close proximity to the mixing chamber. Numeral 104 denotes the back of control unit housing 40 (FIG. 3) which is secured to a plate 106 by means of two screws 108. Formed integrally with plate 106 is a bracket 110 that includes a downwardly turned terminal part 112 having a circular opening therethrough (not shown) which receives a fitting 114. Fitting 114 is of conventional construction and includes a nut 116 which holds the terminal part 112 of bracket 110 securely against part 118 of the foaming apparatus gun head 17. Fitting 114 also includes a second nut 120 for securement to the inlet end of mixing chamber 16 (FIG. 1).

The gun head itself, which is partially shown in FIG. 5, is a modified version of the gun head disclosed in U.S. Pat. No. 3,409,404, issued Nov. 5, 1968 to Sobek et al, the entire disclosure of which is incorporated herein by reference. In essence, the modification resides in the provision of a crank 124 in lieu of the finger trigger disclosed in the above-noted Sobek et al patent, for turning valve actuators 126 and 128. Crank 124 has oppositely extending rods 130 and 132 which are connected to valve actuators 126 and 128, respectively.

It will be noted that push rod 36, which protrudes from control unit 24 (see also FIGS. 1 and 3), extends through a fitting 134 which is secured to plate 106, the push rod being longitudinally movable within fitting 134. The end of push rod 36 engages crank 124 as shown. Thus when push rod 36 moves forward, it turns valve actuators 126 and 128 which in turn cause the valves within the gun head to open. As a result, the reactants are admitted from their respective tanks into the gun head through conduits 20 and 22 (see also FIG. 1) and entry ports 136 and 138, respectively; and from there they are delivered to the mixing chamber (not shown in FIG. 5) through common outlet 140. In certain applications, it may be desirable or preferred to provide check valves (not shown) at or near each of entry ports 136 and 138. This is in order to control or prevent the backward flow of reactants, when the foaming operation is stopped, through conduits 20 and 22.

The rear section of the gun head also includes a separate, third, valved entry port or passageway (not shown) which is in communication with conduit 38 (FIGS. 1 and 3) for occasionally admitting pressurized fluid into the mixing chamber to purge residual material therefrom. This third entry port may also be provided with a check valve (not shown) to prevent backward flow of residual reactants and/or purge fluid at the end of the purging operation.

Figure 6:
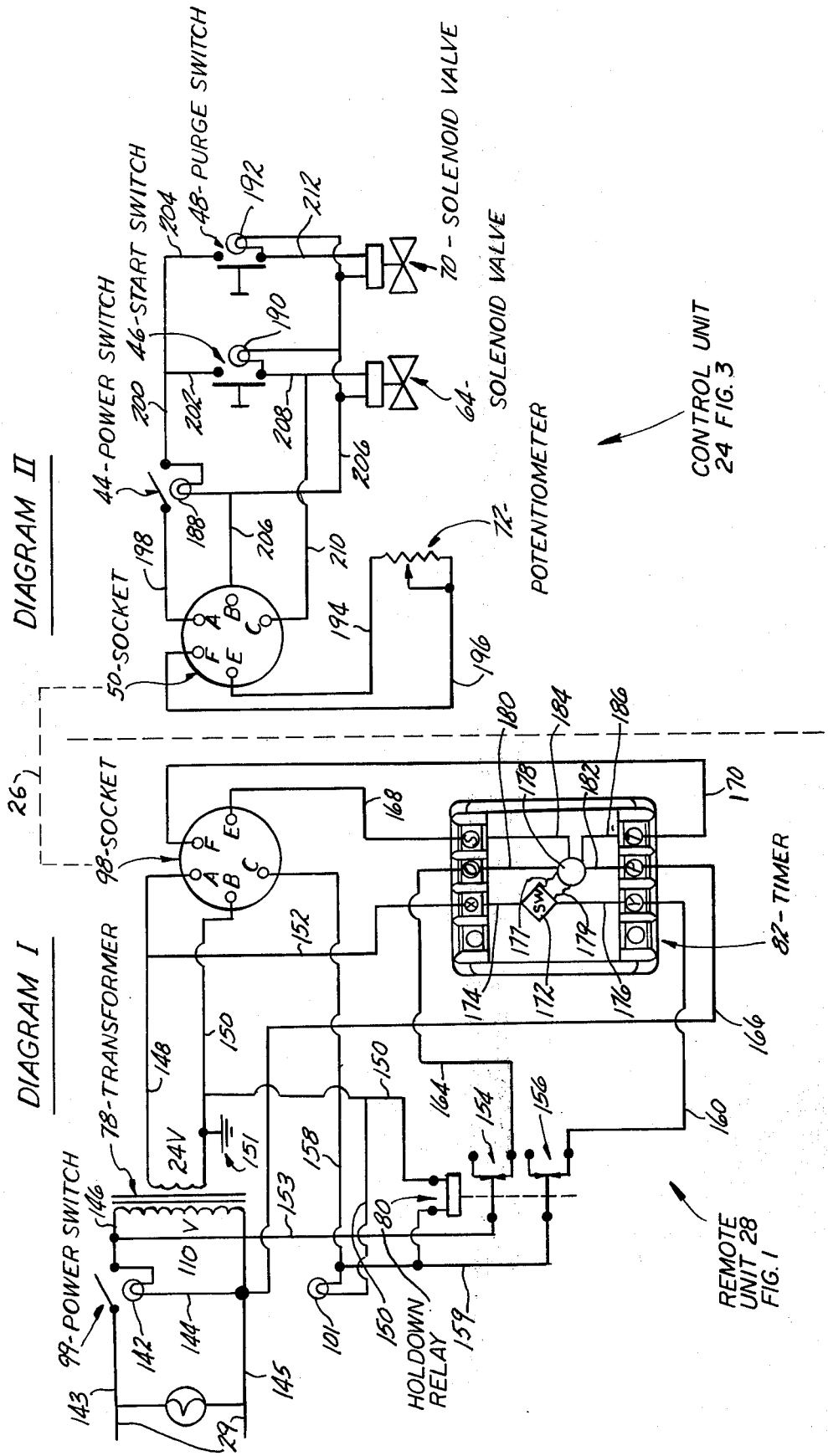
FIG. 6 is a diagram of the electrical circuitry used to operate the apparatus illustrated in FIG. 1.

The electrical circuitry utilized in operating the foaming apparatus illustrated in FIG. 1 is detailed in FIG. 6 in which Diagram I represents the electrical circuit of remote unit 28 and Diagram II represents the electrical circuit of control unit 24, the two circuits being electrically connected via electrical cable 26 (FIG. 1) linking electrical socket 98 in Diagram I with electrical socket 50 in Diagram II. In Diagram I, numeral 29 denotes the electrical cnductor (see FIG. 1) having a plug connector (not shown in FIG. 6) adapted to be plugged into a conventional electrical outlet for supplying power, i.e., 110 volts of electricity, to transformer 78.

The circuit of Diagram I is comprised of power switch 99, operating signal light 101, transformer 78, hold-down relay 80 and timer 82, all these components being shown and identified by the same numerals in FIG. 4. Electrical power is supplied to switch 99, which incorporates a power-on signal light 142, through conductor 29 and power input leg or conductor 143; and conductor 144 connects switch 99 to neutral leg 145 of conductor 29. Conductor 146 connects switch 99 to the primary of transformer 78, the transformer secondary being in turn connected via conductor 148 to terminal point A in socket 98. Conductor 150, which is grounded at 151, is the neutral line for the transformer secondary, terminal point B in socket 98, light 101 and relay 80. The secondary of transformer 78 is also connected to terminal X of timer 82 via conductor 152 which branches off from conductor 148.

Relay 80 comprises two contacts, 154 and 156, both of which are normally biased to the open position, their circuits becoming closed when relay 80 is energized. Conductor 158 connects terminal point C in socket 98 with light 101 and, through branch-off conductor 159, with relay 80 and contact 156 thereof. The latter contact is linked to terminal Y of timer 82 via conductor 160. Conductor 153 connects switch 99 to contact 154 of relay 80 for delivery of 110 volts of electricity thereto, this contact 154 being linked, by means of conductor 164, to terminal O of timer 82. Terminal P of timer 82 is connected to neutral leg 145 via conductor 166; and terminals S and T of timer 82 are connected to terminal points E and F in socket 98 via conductors 168 and 170, respectively.

The timer 82 which is shown in Diagram I of FIG. 6 is of the solid state type and in this instance a product of Regent Controls, Inc. It was purchased under the trademark "Regent" and it is further identified as model No. TM400. Within the timer, numeral 172 denotes a solid state switch which is connected to terminal X via conductor 174 and to terminal Y via conductor 176. Numeral 178 denotes a solid state logic which is connected to terminals O, P, S and T via conductors 180, 182, 184 and 186, respectively. By means of internal connections, as indicated at 177 and 179, between switch 172 and logic 178, switch 172 is adapted to close when logic 178 is energized, and it times to open, the opening time period being controlled by potentiometer 72 (Diagram II). Switch 172 is also adapted to reset (i.e., open) instantly when logic 178 is de-energized.

The circuit of Diagram II in FIG. 6 comprises push-on, push-off power switch 44, start switch 46, purge switch 48, solenoid valve 64, solenoid valve 70, and potentiometer 72, all of which items are shown and identified by the same numerals in FIG. 3. Switches 46 and 48 are of the push-on, release-off type. Switches 44, 46, and 48 incorporate signal lights 188, 190 and 192 respectively.

It is to be noted that cable 26 (not shown in FIG. 6 but shown in FIG. 1) connects socket 50 in Diagram I with socket 98 in Diagram II such that terminal points A, B, C, E and F in socket 50 are connected to terminal points A, B, C, E and F, respectively, of socket 98.

Potentiometer 72 is connected to terminal points E and F of socket 50 by means of conductors 194 and 196, respectively; and by virtue of the cable connection, as indicated above, between socket 50 and socket 98 (Diagram II), potentiometer 72 is connected to terminal points E and F of socket 98 which in turn are connected to terminals S and T of timer 82 through conductors 168 and 170, respectively. In this fashion, potentiometer 72 is linked to logic 178 and switch 172 of timer 82 (Diagram II).

Switch 44 is connected to terminal point A in socket 50 by means of conductor 198; and to switches 46 and 48 by means of conductor 200 and branch-off conductors 202 and 204, respectively.

By virtue of being connected to neutral terminal point B in socket 98 (Diagram I), terminal point B in socket 50 (Diagram II) is neutral. Thus conductor 206, which leads thereto, provides the common neutral line for lights 188, 190 and 192 and also for solenoid valves 64 and 70. Solenoid valve 64 is connected to switch 46 by means of conductor 208 and to terminal point C of socket 50 by means of branch-off conductor 210. Solenoid valve 70 is connected to switch 48 by means of conductor 212.

In operation, with potentiometer knob 74 (FIG. 3) set for a pre-selected time interval, the first step is to depress power switch 99 thereby closing the circuit through this switch. As a result, indicator light 142 and transformer 78 are energized. Furthermore 110 volts of electricity become available at contact 154 of relay 80, and a lower voltage (e.g., 24 volts) of electricity becomes available from the transformer secondary to switch 44 via conductor 148, terminal point A of socket 98, terminal point A of socket 50 and conductor 198. In addition, by means of branch-off conductor 152, the 24 volts of electricity become available to terminal X of timer 82.

The second step is to depress and thereby energize switch 44. This results in indicator light 188 becoming energized, and the 24 volts of electricity becoming available to switches 46 and 48.

The third step is to depress and thereby energize switch 46. This energizes indicator light 190 and solenoid valve 64, and it causes 24 volts of electricity to flow through conductor 210 to terminal point C in socket 50. From there, the 24 volts of electricity flow through terminal point C in socket 98, and conductor 158 causing light 101 to become energized. Also the flow of electricity from conductor 158 through conductor 159 energizes relay 80. As a result, contacts 154 and 156 of relay 80 close. The closing of contact 154 energizes logic 178 of timer 82, 110 volts of electricity flowing into it via conductor 164, terminal O, and conductor 180 and out via conductor 182, terminal P and conductor 166.

As a result of the energization of logic 178 in timer 82, switch 172 closes. Consequently, the flow of 24 volts of electricity through solenoid valve 64 and lights 190 and 101 is maintained even after depressive pressure on switch 46 is discontinued causing this switch to revert to the open position. This is by virtue of the fact that the closing of switch 172 closes a circuit between the secondary of transformer 78 and switch 46. Tracing this circuit, electrical current flows from the transformer secondary through conductors 148 and 152, terminal X of timer 82, conductor 174, switch 172, conductor 176 and terminal Y. From terminal Y, the flow of current continues through conductor 160, contact 156 of relay 80, conductor 159 and conductor 158 to terminal point C of socket 98. Continuing from this socket to terminal point C of socket 50, the electrical current flow proceeds through conductor 210 and conductor 208 to solenoid valve 64 and light 190.

It is to be noted that for the duration of time that switch 172 of timer 82 remains closed, solid state logic 178 remains energized. This is by virtue of the fact that relay 80 remains energized with the flow of electrical current through conductors 158 and 159 as traced above. With relay 80 remaining energized, contact 154 remains closed thereby maintaining the flow of 110 volts through conductor 164, terminal O in timer 82, and conductor 180 leading into logic 178.

As indicated above, switch 172 of timer 82 remains closed for the particular time interval which had been preselected by manipulating knob 74 (FIG. 3) on potentiometer 72. At the end of this interval, switch 172 opens thereby breaking the circuit traced above between the secondary of transformer 78 and solenoid valve 64. As a result, the flow of the 24 volts of electricity to solenoid valve 64 is halted and this valve is de-energized as is light 190. And by virtue of the fact that the flow of electrical current through conductors 158 and 159 is discontinued, light 101 and relay 80 are de-energized. Consequently, contact 154 of relay 80 opens thereby halting the flow of 110 volts of electricity through conductor 164 to logic 178 which is thereby also de-energized. The operating cycle can thereafter be repeated by simply depressing switch 46 again.

For the pre-selected period of time during which the solenoid valve 64 remains energized and consequently open, pressurized fluid flows therethrough the pneumatic cylinder 62 (FIG. 3), which causes push rod 36 to move forward. In assuming this forward position, push rod 36 motivates crank 124 (FIG. 5) to open the two reactant inlet valves, within the gun head, thereby allowing the two foam forming reactants to flow from their respective supply tanks (FIG. 1) into, through and out of mixing chamber 16 and delivery tube 18.

After repeated operations of the foaming apparatus, in some instances after dispensing a single foam shot, it may be necessary or desirable to purge the system with a fluid in order to remove residual material accumulating therein. Utilizing the pressurized fluid source which is used in foam generation, the apparatus illustrated herein again enables the foaming operator to carry out this purging operation easily, rapidly and without requiring the help of a second operator. To do this, with switches 99 and 44 remaining in the "on" or closed position, the operator simply depresses switch 48, maintaining the finger pressure on this switch for the time it takes to purge the system, i.e., usually a few seconds. As a result of switch 48 being depressed, light 192 and solenoid valve 70 are energized. With solenoid valve 70 energized and therefore opened, pressurized fluid flows therethrough, out of control unit 24, and through conduit 38, the gun head inlet (not shown), the mixing chamber and the delivery tube (FIG. 1). After such purging operation, the timed dispensation of foam may be immediately resumed by depressing switch 46.

The foaming apparatus described herein and illustrated by the drawings represents a preferred mode or embodiment for practicing the concept of the invention. However, it will be appreciated by those skilled in the art that numerous changes and modifications may be made within the scope and spirit of the invention. For example, suitable means may be employed, in lieu of the solenoid valve and pneumatic cylinder called for in the drawings, for opening and closing the valve assemblies that open into the mixing chamber. Furthermore, the location of the valve assemblies themselves may be altered or these assemblies may be made an integral part of the mixing chamber. By the same token, it is quite apparent that various items utilized according to the preferred embodiment of the invention may be eliminated, modified or replaced with equivalent counterparts without departing from the general concept of the invention.

The apparatus of the invention may be utilized in the mixing and on-site dispensation of any suitable polyurethane foam-forming composition or mixture which lends itself to processing through a portable foaming apparatus of the general type disclosed herein. As is well known in the art, polyurethane foam is produced by the reaction of a polyol with an organic polyisocyanate in the presence of a reaction catalyst and a foaming agent. The polyol reactant can be any suitable polyhydric alcohol, or mixture thereof, having at least two active hydrogens as determined by the Zerewitinoff method, such as disclosed for example in U.S. Pat. No. 3,167,538, issued Jan. 26, 1965. Similarly any suitable organic isocyanate containing at least two NCO groups may be employed in preparing the foam. Illustrative are toluene diisocyanate (such as the 80/20 weight mixture of 2,4-/2,6-isomers) and the polymeric isocyanates. Further illustrations of useful organic isocyanates are provided in U.S. Pat. No. 2,683,730, issued July 13, 1954. The foaming agent can be any one of those known in the art to be useful for this purpose such as water, organic foaming agents, or a mixture of two or more foaming agents, the organic foaming agents being preferred. Illustrative organic foaming agents are disclosed in U.S. Pat. No. 3,072,582, issued Jan. 8, 1963. Finally any catalyst, or mixture of catalysts, known to be useful in the production of polyurethane foam may be employed, such as the catalysts disclosed in U.S. Pat. No. 3,397,158, issued Aug. 13, 1968.

Referring again to FIG. 1, a first reactive material comprising the polyol reactant is supplied from one of the two reactant supply tanks, for example first reactant tank 4. Conveniently, the first reactive material may also include a reaction catalyst. The organic isocyanate is supplied from the other reactant supply tank, e.g., second reactant tank 6. The foaming agent may be supplied from a third supply tank (not shown), or, as is preferred according to the invention, the foaming agent may be included in at least one, and more preferably both, of the two reactants supply tanks. With flow control units 21 and 23 set to deliver the desired ratio of reactants to mixing chamber 16, and with switch 99 turned on, the foaming operation can be performed by a single operator by simply turning selector knob 74 (FIG. 2) to the desired foaming time cycle, and then depressing power switch 44 and start switch 46. At the end of the time cycle, the operator may purge the mixing chamber by depressing switch 48 (FIG. 2) for a few seconds. The procedure is then repeated over and over again, as desired, until such time as no further foaming is required or the supply of materials is exhausted. In the latter case, the electrical power supply is halted, by turning off switch 99 (FIG. 3), and the empty supply tanks are replenished or replaced. Switch 99 is then turned on again and the foaming operation is resumed.

The improved foaming apparatus of the invention enables the repeated on-site generation of accurate-size foam shots which can be varied over a wide range depending on the particular application in which the foam is used. Furthermore, this result is achieved with a minimum of effort and manual labor. As such the apparatus of the invention is of great utility in a variety of commercial and industrial applications including for example the production of foam-insulated food containers, sporting goods, molded furniture parts and structural elements and in the insulation of homes, appliances, and refrigerated trucks.

What is claimed is:

1. In an apparatus for mixing first and second inter-reactive polyurethane foam-forming materials and generating foam therefrom, which apparatus comprises
    a. a first tank for supplying the first material,
    b. a second tank for supplying the second material,
    c. a mixing chamber having inlet means for receiving the first and second materials from their respective tanks and an outlet for dispensing a mixture of said materials from said mixing chamber,
    d. first and second valve means for admitting the flow of the first and second materials, respectively, through said mixing chamber, and,
    e. connecting means for coordinating closing and opening of said first and second valve means,
the improvement which comprises
    f. an electrically energized actuator means for operating said connecting means and
    g. electrical timing means adapted to be connected to an electrical power source, for operating said actuator means for a predetermined time period, said timing means comprising
        1. an electrical timer, which is electrically connected to said actuator means for timed energization thereof,
        2. a potentiometer adjacent to said mixing chamber, said potentiometer being electrically connected to said timer and manually operable to vary the duration of the time period of operation of said timer, and
        3. first switch means mounted adjacent to said mixing chamber for connecting the electrical power source to said timer thereby energizing said timer.

2. The apparatus of claim 1 wherein said mixing chamber is of the static type, having substantially no moving parts.

3. An apparatus as claimed in claim 2 comprising means for imposing gas pressure in said tanks to expel the materials therefrom.

4. The apparatus of claim 3 wherein said electrical actuator means comprises
    a. pneumatic means for actuating said connecting means,
    b. a source of 7 pressurized gas for operating said pneumatic means, and
    c. a first solenoid valve for admitting said pressurized gas to said pneumatic means, said solenoid valve being electrically connected to said timer.

5. An apparatus as claimed in claim 4 which comprises flow control means for controlling the rate of flow of each of the first and second materials from their respective tanks to said mixing chamber.

6. The apparatus of claim 5 wherein said pneumatic means is a pneumatic cylinder having a movable, gas pressure-motivated element for actuating said connecting means.

7. The apparatus of claim 6 wherein said mixing chamber consists essentially of a hollow cylindrical tube having a plurality of curved sheet-like elements extending in series longitudinally within said tube, each element extending to the tube walls throughout its length and dividing its embracing portion of said tube into two separate channels, the total cross-sectional area of each of said channels being substantially constant throughout the length of its dividing element, said elements being arranged alternately and in point-contact with one another substantially along the tube axis.

8. The apparatus of claim 7 wherein said timer is solid state.

9. An apparatus as claimed in claim 7 which also comprises means for flushing said mixing chamber with pressurized gas, said flushing means comprising
    a. a second solenoid valve opening into said mixing chamber,
    b. conduit means by-passing said first solenoid valve and connecting said second solenoid valve to said source of pressurized gas, and
    c. second switch means, mounted adjacent to said mixing chamber, for connecting the electrical power source to said second solenoid valve.

10. An apparatus as claimed in claim 9 which also comprises a step-down transformer, remote from said mixing chamber, for reducing the voltage of electricity supplied from said electrical power source to said first and second switch means.

11. An apparatus as claimed in claim 10 which also comprises means for regulating the pressure of the gas supplied from said source of gas pressure to said first and second solenoid valves.

12. An apparatus as claimed in claim 11 which comprises a housing, in the proximity of said mixing chamber, which houses said first and second switch means, said first and second solenoid valves, said pneumatic cylinder, and said potentiometer.

13. The apparatus of claim 12 wherein said means for imposing gas pressure in said tanks is a nitrogen gas pressure source which is connected to said tanks.

14. The apparatus of claim 13 wherein said pressurized gas used to operate said pneumatic cylinder is air.

* * * * *